Sept. 25, 1962 C. BÉCUE 3,055,736
PROCESS FOR MANUFACTURING ALUMINUM OXIDE
Filed July 15, 1959
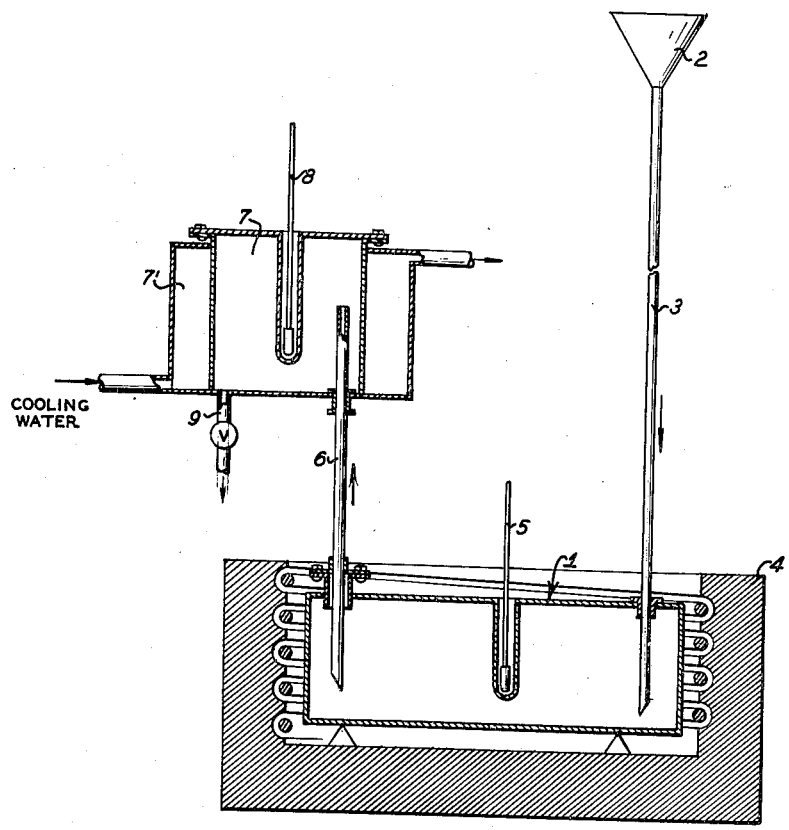
INVENTOR
COLETTE BÉCUE
ATTORNEY

United States Patent Office 3,055,736
Patented Sept. 25, 1962

3,055,736
PROCESS FOR MANUFACTURING ALUMINUM OXIDE
Colette Bécue, Grenoble, France, assignor to Pechiney, Compagnie de Produits Chimiques et Electrometallurgiques, Paris, France, a corporation of France
Filed July 15, 1959, Ser. No. 827,391
Claims priority, application France July 22, 1958
10 Claims. (Cl. 23—141)

The present invention, which is the result of applicant's researches, relates to a process for making aluminum oxide and relates, more particularly, to the preparation of a pure, dispersed aluminum oxide.

It is well known to prepare dispersed aluminum oxide, either by high temperature electrolysis of gaseous aluminum chloride in the presence of water vapor, or by oxidation and/or combustion of solid aluminum is powdered state or otherwise, or of aluminum alcoholate at a high temperature and in the presence of oxygen or air.

The various dispersed aluminum oxides produced according to the processes presently known in the art, and frequently used as fillers for natural or synthetic rubbers or other elastomers, are always characterized by having an external specific surface which is less than 125 m.$^2$/g.; this is true even in the case of the best and the most finely dispersed aluminum oxides obtained by means of the above mentioned process involving the electrolysis of aluminum chloride.

The present applicant has developed a process for making pure, dispersed aluminum oxide, the object of the present invention, which is characterized in that it possesses an external specific surface greater than 150 m.$^2$/g., and even greater than 250 m.$^2$/g., and of the order of 285 m.$^2$/g. and over.

The present invention also has for its object a process for making said aluminum oxide, which consists in dissolving aluminum in mercury, separating it from the resultant amalgam and oxidizing it to aluminum oxide by the action of a hydrating or even, oxidizing medium.

Other objects of the invention will be disclosed in the course of the following description.

Applicant has found that by cooling warm solutions of aluminum in mercury in a hydrating or, even oxidizing medium, the contained aluminum separates out in the form of microcrystals which decant slowly and are quickly hydrated and oxidized, forming a bed of aluminum oxide over the mercury. The aluminum oxide, which can be easily recovered, for example, by being simply skimmed off the mercury surface, presents itself in the form of an impalpable, slightly bluish white powder; it has a very low bulk density, which is less than about 10 g. per liter.

In addition, the aluminum oxide possesses the following several characteristics: an amorphous structure on X-ray analysis; total combustion losses of the order of 40%; loss of about half its water content at a temperature equal to or less than 110° C. while its structure remains always amorphous; on calcination, the structure changes towards the theta form of aluminum oxide.

Moreover, the said aluminum oxide is practically anhydrous after being calcined at 500° C. and then possesses the several following characteristics: bulk density after dispersion, below 0.10 g./cm.$^3$ and of the order of about 0.07 g./cm.$^3$; specific surface, by nitrogen adsorption at $-195°$ C., greater than 150 m.$^2$/g. and of the order of 285 m.$^2$/g. and above; the form of its nitrogen adsorption isotherm, without hysteresis, would suggest that the aluminum oxide of the invention does not have any internal porosity and that the specific surface, given above, corresponds to the external surface of the elementary particles and leads to a size of said particles smaller than a few tenths of a micron, and of the order of 10 millimicrons—additionally confirmed by electron microscope examination—and this is the case before as well as after calcination.

Applicant's researches have, moreover, enabled the development of a process for producing such aluminum oxide; while this process is preferred, it is not given by way of limitation. According to a procedure, known per se, aluminum is dissolved in mercury or a mercury alloy in the absence of oxygen and/or in an inert atmosphere, for example, argon, under high pressure and temperature; the aluminum is either pure or else is contained in an aluminum alloy, such as and without limitation, silicoaluminum, ferro-silico-aluminum, aluminum-aluminum carbide alloys, scrap aluminum, etc. The only metals which are preferably excluded from said alloys are alkaline and/or earth-alkaline metals which, being soluble in mercury and readily oxidizable, would contaminate the aluminum oxide obtained from this process, if they were not preliminarily removed.

According to a preferred and not limiting embodiment of the present invention, the solution of the aluminum in the mercury will be effected at a temperature higher than 200° C. and, preferably, close to 300° C., and the aluminum concentration will be such as to insure that the amalgam, obtained at this temperature, will contain 0.01 to 4% aluminum by weight and, preferably, of the order of 0.1% aluminum.

The solution of aluminum in mercury, obtained according to the invention, is then cooled to a temperature below 120° C. and, preferably, between 80° and 10° C. and of the order of 30° C.; this is done in a hydrating or even oxidizing medium, for example and without limitation, in the presence of moist oxygen, moist air, water vapor, etc.

According to a special, but not limiting embodiment of the invention, the cooled solution is spread out in a thin layer in a moist air atmosphere, the thickness of said layer being for instance within the range of about 2 to about 50 mm., and more particularly of the order of 20 mm. The microcrystals which slowly ascend to the surface of the mercury are then converted to hydrated aluminum oxide which floats on the mercury. The formed aluminum oxide layer is then recovered, for example, by scraping it off from the surface of the mercury as soon as it is formed. Indeed, applicant has established that it is preferable not to permit the formation of an aluminum oxide layer which exceeds a certain thickness, for example, one centimeter, or even one-half centimeter, because when the layer becomes too thick, a thin film of mercury may form, sticking to and surrounding the lower parts of particles of aluminum oxide, which is difficult to remove later on.

The process of making dispersed aluminum oxide according to the present invention can be readily carried out in a continuous or batch operation. Moreover, applicant has established that it is possible to replace mercury by gallium, all the other elements of the present invention remaining the same. However, taking into account the rarity of gallium, the economic aspects of the process and, additionally, the difficulty of removing traces of gallium which may eventually be entrained along with the resultant dispersed aluminum oxide by reason of the high boiling point of gallium, mercury or its alloys will be preferably used according to the invention.

The following example, which is in no way limiting, has for its sole purpose to illustrate the process of producing the pure dispersed aluminum oxide which is the object of the present application.

The attached single figure illustrates, schematically, an apparatus for carrying out in batch operation the process of the present invention.

In cell 1 there is preliminarily introduced a certain quantity of aluminum in the form of lumps; the cell is then filled with cold mercury by means of funnel 2 and tube 3, of variable height, for example 2.50 m., which creates a given pressure in the entire apparatus.

The cell 1 is then electrically heated, by means of the jacket 4, to a temperature near 300° C. which is measured by thermometer 5. The resultant warm solution of aluminum in mercury is conveyed via duct 6 into tank 7, provided with a jacket 7′ through which circulates cooling water, whereby the solution is cooled to a temperature of about 30° C., which is measured by thermometer 8. At this temperature, the dissolved aluminum crystallizes out.

The resultant suspension is then passed via duct 9 to a crystallizer, not shown on the drawing, and is spread out in a layer of slight thickness; the crystallizer is open, which makes it possible to set up a large (exchanging) surface in contact with the moist ambient air.

There is then slowly formed upon the surface of the mercury a thin, white, slightly bluish aluminum oxide layer which is immediately recovered by means of a system of scrapers which skim the surface of the mercury.

The recovered hydrated aluminum oxide, which is amorphous and has a bulk density of less than 0.01 g./cm.$^3$, is calcined at 500° C.; there is then obtained an anhydrous aluminum oxide which has an apparent density of 0.07 g./cm.$^3$, an average external specific surface of 285 m.$^2$/g.; the elementary particles of this oxide, generally of spherical shape, have a size of about 10 millimicrons.

The mercury recovered after the separation of the aluminum is reintroduced at 2 into cell 1; it can thus be recycled until the aluminum introduced at 1 is exhausted.

Where the heat of hydration and/or oxidation of the aluminum, at the surface of the mercury, may produce a rise in temperature capable of impairing the quality of the produced aluminum oxide—for example, by the massive formation of microcyrstals which decant rapidly— it is necessary to remove the heat thus liberated. This is done, for example, and without limitation, by simply blowing said surface with a gas, among others with air, more or less moist, and/or more or less enriched with oxygen and/or nitrogen. The aluminum oxide flakes thus entrained are collected by any means known in the art, as by precipitation in a cyclone, or filtration on fabric and/or paper bags.

When the concentration of aluminum in the mercury is such that there is obtained on cooling, a concentrated suspension of aluminum microcrystals, such a blowing operation may prove insufficient. In that case, the formation of aluminum oxide is reduced by any suitable means, for example, by the following non-limiting procedure: the mercury containing the suspended aluminum is exposed as before, but for a rather short time, to a moist air current; it is then energetically shaken while being protected from the air, cooled, and again exposed for a rather short time to a moist air current.

This treatment is repeated several times in order to limit, at each stage, the quantity of aluminum oxide formed and to disperse and/or remove, between each hydration and/or oxidation stage, the previously liberated heat. Moreover, the air used can be more or less rich in moisture and/or oxygen.

When the major part of the aluminum has been converted to aluminum oxide, the conversion is, on the contrary, accelerated in order to completely exhaust the mercury from the aluminum microcrystals contained therein; this can be achieved, for example, by centrifuging the mercury and forcing the separation of the solid aluminum, which is then hydrated and oxidized in the presence of air which is more or less moist and rich in oxygen. Moreover, the mercury can eventually be reheated.

I claim:

1. Process for producing pure dispersed amorphous aluminum oxide by dissolving at a temperature above 200° C. in a non-oxidizing atmosphere a substance selected from the group consisting of aluminum and alloys thereof other than alkaline and alkaline earth metal alloys in one of the materials of the group consisting of mercury, alloys of mercury and gallium to yield a concentration of substance within the range of 0.01 and 4% by weight; spreading said solution into a thin layer and cooling the solution to a temperature below 120° C., whereby the aluminum separates therefrom in the form of microcrystals; contacting said microcrystals at the surface of the solution with a moistened oxidizing atmosphere, and thereby forming a floating layer of pure finely dispersed aluminum oxide on top of said solution.

2. Process according to claim 1 wherein said moistened oxidizing atmosphere consists susbtantially of moist air.

3. Process for producing pure dispersed aluminum oxide, comprising the steps:
   (a) dissolving in a non-oxidizing atmosphere aluminum in mercury at a temperature of the order of about 300° C. to yield a concentration of aluminum within the range of 0.01% and 4% by weight;
   (b) cooling the solution of aluminum in mercury to a temperature within the range of about 80° C. to about 10° C.;
   (c) spreading out said solution in a thin layer;
   (d) bringing the surface of said layer into contact with an hydrating oxidizing medium;

whereby the dissolved aluminum separates out from the solution in the state of microcrystals and oxidizes at the surface into finely dispersed aluminum oxide, forming a floating layer on top of said solution.

4. Process according to claim 3, wherein the thickness of the layer of said solution is of the order of about 20 mm.

5. Process according to claim 1, wherein the thickness of the floating aluminum oxide layer is kept below about 5 to 10 mm. by skimming off the formed aluminum oxide substantially as fast as it is formed.

6. Process according to claim 1, wherein a water vapor current is passed over the solution, whereby the heat liberated during the oxidation of aluminum microcrystals is removed and the temperature of said solution is controlled.

7. Process according to claim 1, wherein a current of oxygen is passed over the solution, whereby the heat liberated during the oxidation of aluminum microcrystals is removed and the temperature of said solution is controlled.

8. Process for producing dispersed aluminum oxide, comprising the steps:
   (a) dissolving at a temperature above 200° C. in a non-oxidizing atmosphere aluminum in one of the materials selected from the group consisting of mercury, alloys of mercury and gallium to yield a concentration of aluminum within the range of 0.01% and 4% by weight;
   (b) spreading the solution into a thin layer and cooling the solution to a temperature below 120° C., whereby the aluminum separates therefrom in the form of microcrystals;
   (c) bringing the surface of said layer of cooled solution into contact with an hydrating-oxidizing reagent, whereby the aluminum microcrystals oxidize at the surface into finely dispersed aluminum oxide;
   (d) recovering said aluminum oxide;
   (e) thoroughly shaking in an inert medium the mercury and aluminum solution remaining after recovery of the aluminum oxide;
   (f) cooling the mixture thus obtained to remove the heat generated during the oxidation of the aluminum microcrystals;
   (g) bringing into contact with an hydrating oxidizing medium; and (h) recovering the aluminum oxide separated therefrom.

9. Process according to claim 1, wherein the dissolution is carried out at a temperature close to 300° C.

10. Process according to claim 1, wherein the resultant aluminum solution is cooled to a temperature of the order of 30° C.

References Cited in the file of this patent

UNITED STATES PATENTS

| | | |
|---|---|---|
| 2,449,847 | Heard | Sept. 21, 1948 |
| 2,643,935 | Halversen | June 30, 1953 |
| 2,746,842 | Block et al. | May 22, 1956 |
| 2,787,522 | Le Francois | Apr. 2, 1957 |
| 2,847,387 | Smith | Aug. 12, 1958 |
| 2,867,505 | Block | Jan. 6, 1959 |
| 2,982,614 | Csordas et al. | May 2, 1961 |

FOREIGN PATENTS

| | | |
|---|---|---|
| 815,513 | Great Britain | June 24, 1959 |
| 815,514 | Great Britain | June 24, 1959 |